United States Patent [19]

Ippen et al.

[11] Patent Number: 4,493,355

[45] Date of Patent: Jan. 15, 1985

[54] VEHICLE TIRE

[75] Inventors: Jakob Ippen, Leverkusen; Friedel Stüttgen, Pulheim, both of Fed. Rep. of Germany

[73] Assignee: Bayer Aktiengesellschaft, Leverkusen, Fed. Rep. of Germany

[21] Appl. No.: 338,356

[22] Filed: Jan. 11, 1982

[30] Foreign Application Priority Data

Jan. 17, 1981 [DE] Fed. Rep. of Germany ....... 3101408

[51] Int. Cl.³ .......................... B60C 7/00; B60C 7/12
[52] U.S. Cl. .................................. 152/329; 152/310; 152/318; 152/393
[58] Field of Search ............................... 152/323–325, 152/327, 393, 329, 188, 310, 311, 318

[56] References Cited

U.S. PATENT DOCUMENTS

| | | | |
|---|---|---|---|
| 1,466,133 | 8/1923 | Lundstrom | 152/310 X |
| 2,345,068 | 3/1944 | Pfeiffer | 152/327 X |
| 4,033,395 | 4/1977 | Berg et al. | 152/327 X |
| 4,320,791 | 3/1982 | Fujii et al. | 152/362 R |

Primary Examiner—David A. Scherbel
Assistant Examiner—Russell D. Stormer
Attorney, Agent, or Firm—Connolly and Hutz

[57] ABSTRACT

Puncture-proof vehicle tires consisting essentially of one material and comprising a tread thicker than the side walls, an encircling empty space between the tread and the base of the tire and an encircling plastics reinforcement in the base of the tire.

8 Claims, 4 Drawing Figures

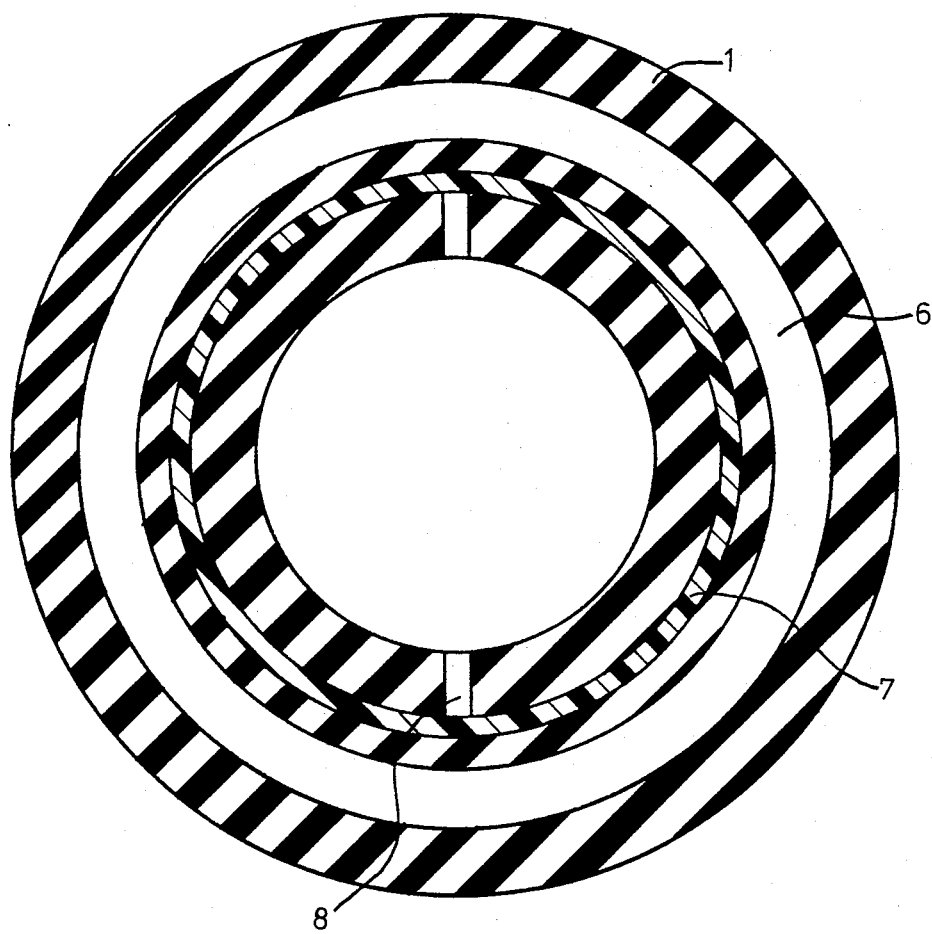
FIG. 4 (A-A)

VEHICLE TIRE

This invention relates to puncture-proof vehicle tires, primarily intended for slow-moving vehicles, particularly two-wheeled vehicles, such as bicycles or wheelchairs. The tires which generally consist of one and the same material have a tread thicker than the side walls, an encircling empty space between the tread and the base of the tire and an encircling plastics reinforcement in the base.

The load-bearing element of conventional pneumatic tires for vehicles is the carcass. This is in principle a hollow body in the form of a torus of vulcanized rubber which contains reinforcing elements (textile cord) designed to withstand tensile stressing. The hollow body is filled with air under excess pressure. Its side walls are under tensile stress. The weight of the vehicle counteracts this tensile stress and partly eliminates it. If a tire of the type in question develops an air leak and loses its internal pressure, the compressive stress applied by the weight of the vehicle predominates. The tire loses its shape and becomes unusable in practice.

Solid rubber tires, which do not contain any air under pressure as the cushioning element of rubber, are not attended by this disadvantage. However such tires do have the disadvantage that they are extremely heavy. A high resistance to rolling is developed during rolling, leading to a build-up of heat at relatively high speeds, which destroys the tire.

German Offenlegungsschrift No. 24 60 051 describes puncture-proof two-wheeler tires with a continuous base in which for example, sinusodial grooves are formed in the side walls to reduce the weight of the tire. The presence of the grooves provides for a segment-like construction of the tire and for the formation of reinforcing elements between the tread and the base of the tire thus guaranteeing the necessary cushioning properties. In general, tires of this type are fitted to the rim by simple biasing because the continuous base prevents the introduction of conventional steel reinforcements. However, tests carried out with tires of this type have shown that they are not suitable in every case, for two-wheelers or wheelchairs. When fitted to two-wheelers, tires of the type in question can become detached from the rim around curves or under the effect of centrifugal force. In the case of wheelchairs, detachment of the tire from the rim can occur in the event of on-the-spot turning maneuvers.

In addition, all conventional tires, including standard pneumatic tires, are made in standard vulcanizing molds, in other words a special vulcanizing mold is required for each individual tire size. In addition, known puncture-proof two-wheeler tires are generally much heavier than normal pneumatic tires.

The object of the present invention is to provide a lightweight tire primarily for slow-moving vehicles, particularly two-wheeled vehicles, which does not lose its load-bearing capacity even in the event of relatively minor damage (for example punctures) and, moreover, has good cushioning properties. In addition, the invention seeks to use the same material to enable modern mass-production techniques to be applied (extrusion of the cross-section, cutting to length and fitting together). Another object of the invention is to ensure that the tire is maintained in position press-fitted to the rim by suitable means.

According to the invention, this object is achieved in that the tires are composed of a continuous base, side walls and a tread which consist, in a merging relationship, of the same material, an encircling empty space being situated between the tread and the base of the tire and the base containing an encircling reinforcement of plastic by which a firmer and safer press-fit of the tire on the rim is obtained. The tread is formed radially outwards with a pronounced convex curve, increasing in thickness towards the zenith so that the moment of inertia of the tread is at least six times greater than that of the side walls.

Accordingly, the present invention provides vehicle tires consisting of a base, side walls and tread merging with one another, characterized in that (a) the tires have an encircling empty space between the base and tread, (b) the tread increases in thickness towards its zenith so that the moment of inertia of the tread is at least six times greater than that of the side walls; and (c) the base of the tire contains an encircling reinforcement of plastics material.

It is surprising to the expert that it is possible to produce such tires, which have no reinforcing material (tire cord, wire cores), do not use air under pressure as the cushioning element and, in spite of this, have the same properties as normal tires in regard to weight, cushioning behaviour, resistance to rolling and have a firm tire-to-rim fit.

The tread of the tires may be smooth or provided with profiles. It is preferably provided with profiles which extend over the entire periphery of the tire in the rolling direction.

In principle, the encircling empty space between the tread and base, which is largely responsible for cushioning behavior of the tire, may have any suitable shape. The shape of the empty space is preferably selected such that it sustantially corresponds to the outer shape of the tire. In one particularly preferred embodiment, the empty space is elliptical, bell-shaped or wedge-shaped (cf. FIGS. 1 to 3) when viewed in cross section.

The areas where the side walls merge with the tire base are indented so that the side walls are supported by the wheel flange. The base of the tire itself is adapted in its shape to the contour of the rim. This, in conjunction with the encircling plastics reinforcement in the base of the tire, provide for a safer press-fit of the tire on the rim. In general, the plastics reinforcement has a tape-like substantially rectangular cross-section (cf. FIGS. 1 and 2). The plastics reinforcement is preferably orientated parallel to the slope of the rim and, in that case, it may have an angular cross-section, for example (cf. FIG. 3).

The tires are best initially made with a suitable recess or depression in the base into which the plastics reinforcement is subsequently introduced. The tires are produced in a particularly advantageous and economical manner by extruding and subsequently vulcanizing corresponding profiles. Vulcanization may be carried out continuously, for example by ultra-high frequency. The extruded and vulcanized profiles are then cut to a length corresponding to the required circumference of the tire and joined firmly together at their ends. Accordingly, there is no need to have a special expensive vulcanization mold ready for each tire diameter. Before vulcanization, a profile may be impressed by transverse rolling on the tread of the extruded longitudinal profile to improve the grip of the tire.

The production is simplified by comparison with conventional pneumatic tires because the use of one material means that the tire does not have to be built up in layers. Accordingly, the economic saving is considerable.

The pre-fabricated tire is press-fitted over the rim or wheel flange. The tire is easy to fit because the bias applied in the peripheral direction need only amount to between 0.5% and 1%.

The plastics reinforcement is preferably introduced into the recess in the base of the tire after the tire has been made and fitted onto the rim. To this end, a liquid reactive plastics mixture is introduced under pressure into the recess through injection openings in the rim and hardened. Plastics mixtures having reaction times of 10 seconds are preferably used. After hardening, a satisfactory form-locking effect is obtained for transmitting the drive and lateral forces so that the forces of the vehicle are safely transmitted to the resilient side walls and through the tread to the ground.

The resulting tires have good true-running properties and high lateral stability. Even centrifugal forces occurring at relatively high speeds are unable to detach the tire from the rim. The tires are unaffected by cuts and punctures because there is no air under pressure (cushioning element) to escape. They are particularly suitable for invalid chairs or two-wheeled vehicles.

Accordingly, the present invention also provides a process for the production of vehicle tires which is characterised in that a profile corresponding to the required tires cross-section is produced by extrusion, having a recess in the base of the tire for accommodating the plastics reinforcement, the profile thus extruded is vulcanized and fitted onto the rim, after which a reactive plastics mixture is introduced into the recess in the base of the tire and hardened.

Various embodiments of the tires according to the invention are shown in FIGS. 1 to 4 of the accompanying drawings, wherein;

FIG. 4 is a longitudinal section through a preferred tire along the line A—A in FIG. 1.

Figure 1:
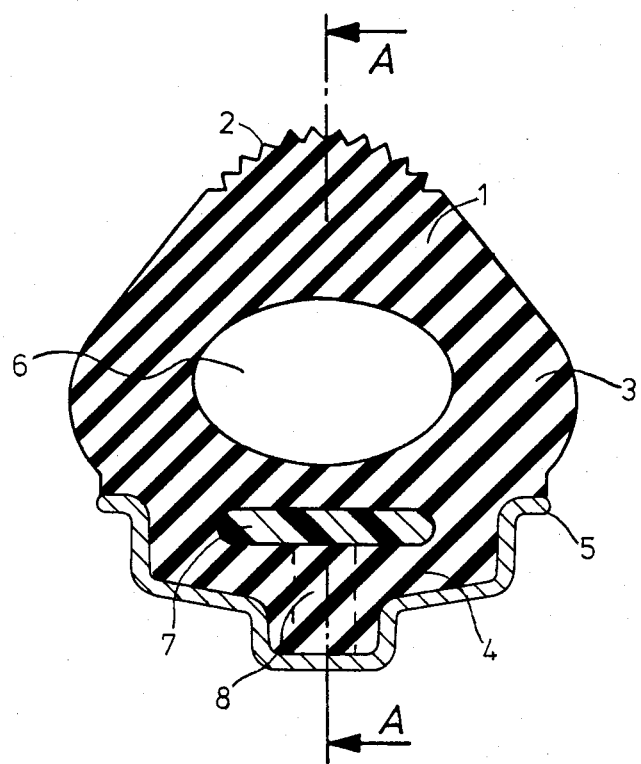
FIG. 1 is a cross-section through a preferred tire.

FIG. 1 is a cross-section through an extruded tire on a rim. The maximal thickness, at its zenith, of the tread (1) provided with profiles (2) gradually narrows down into the side wall (3) which is adjoined by the continuous base (4) adapted to the contour (5) of the rim. The function of the elliptical empty space (6) is to ensure a comfortable ride. The base of the tire is formed with an encircling recess (7) which, at two points of the circumference, is connected to two injection bores (8). The injection bores (8) function as introduction passageways for plastic material supplied to the encircling recess (7).

Figure 2:
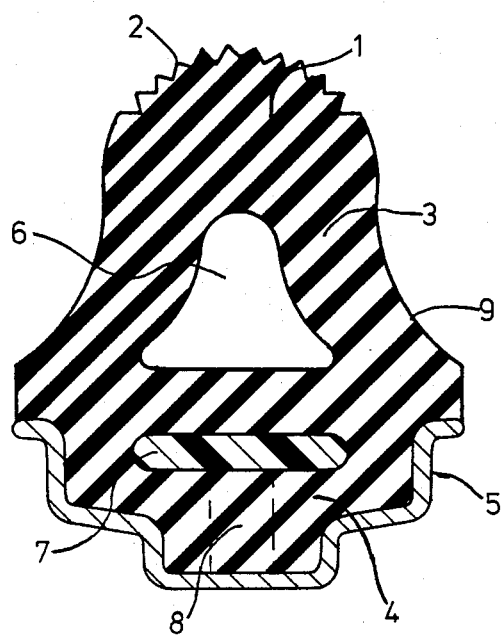
FIGS. 2 and 3 are cross-sections through two embodiments.

FIG. 2 is a cross-section through a tire comprising a tread (1) profiles (2), a base (4) with a recess (7), a rim (5) and an injection bore (8). The side wall (3) of the tire has an outer contour line (9) extending from the tread to the wheel flange. Accordingly, the empty space (6) between the tread (1) and the base (4) of the tire is bell-shaped such that the tire has a predetermined indention and recovery characteristic.

Figure 3:
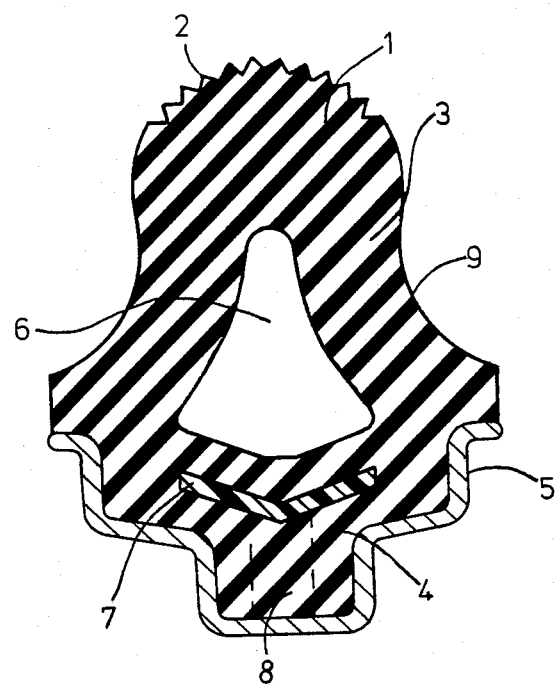

FIG. 3 is a cross-section through a tire similar to the tire shown in FIG. 2 with a tread (1) provided with profiles (2), a side wall (3) with a contour line (9), a base (4), a rim (5) and an injection bore (8).

In this case, however, the recess (7) in the base (4) of the tire runs parallel to the slope of the rim and is therefore angular shape. Accordingly, the empty space (6) is wedge-shaped.

FIG. 4 is a longitudinal section through the tire shown in FIG. 1 along the line A—A with the tread (1), empty space (6), recess (7) and the injection bores (8) opening into the recess.

The tires according to the invention may be made of any natural or synthetic rubber of which the vulcanizates have a shore-A-hardness of from 45 to 80 and a modulus value of from 3.0 to 9.0 MPa 300% elongation. Natural rubber, styrene-butadiene rubber, polybutadiene and ethylene/propylene terpolymer rubber. The weight of the tire is comparable with that of a normal pneumatic tire. The tires may be produced for example from the following rubber mixture:

| | |
|---|---|
| Natural rubber | 100.0 parts by weight |
| Precipitated silica, medium activity | 45.0 parts by weight |
| Titanium dioxide | 3.0 parts by weight |
| Mineral oil, naphthenic | 2.0 parts by weight |
| Mixed hydrocarbons | 0.8 part by weight |
| Unsaturated ethers | 2.0 parts by weight |
| Stearic acid | 1.0 part by weight |
| Diphenylamine derivative | 0.6 part by weight |
| Mixed aralkylated phenols | 0.6 part by weight |
| Ethylene glycol | 1.5 parts by weight |
| Triethanolamine | 1.5 parts by weight |
| Zinc oxide | 5.0 parts by weight |
| Phthalic acid anhydride | 0.5 part by weight |
| Coated calcium oxide | 7.5 parts by weight |
| Pigment (red or green) | 1.5 parts by weight |
| Zinc salt of 2-mercaptobenzthiazole | 1.2 parts by weight |
| Diorthotolyl guanidine | 0.4 part by weight |
| Sulfur | 2.0 parts by weight |
| Platicity of mixture/80% | |
| Defo hardness/Defo elaticity | 500/16 |
| Tensile strength (MPa) | 19.9 |
| Breaking elongation (%) | 600 |
| Modulus at 300 elongation (MPa) | 5.6 |
| Pohle tear propagation resistance (N) | 280 |
| Hardness at 20° C. (Shore A) | 56 |
| Shock elasticity (DIN 53512) (%) | 62 |

In principle, any reactive hardenable plastics mixture may be used for the plastics reinforcement in the base of the tire. The reinforcement preferably consists of a polyurethene. It may be for example from the following two formulations:

| Formulation 1 | | |
|---|---|---|
| $C_4$—polyether, molecular weight 2000 | | 100.0 parts by weight |
| Tolylene diisocyanate | | 24.4 parts by weight |
| 4-Chloro-3,5-diaminobenzic acid isobutyl ester | | 14.7 parts by weight |
| Properties: | | |
| Hardness | DIN 53305 (Shore A) | 87 |
| $\sigma B$ | DIN 53504 (MPa) | 37 |
| $\epsilon B$ | DIN 53504 (%) | 550 |
| $\sigma 100\%$ | DIN 53504 (MPa) | 8 |
| $\sigma 300\%$ | DIN 53504 (MPa) | 13 |
| Formulation 2 | | |
| Adipic acid/butane diol/ethylene gylcol mixed ester | | 100.0 parts by weight |
| 4,4'-diisocyanatodiphenyl methane | | 40.0 parts by weight |
| 1,4-butane diol | | 9.0 parts by weight |
| Properties: | | |
| Hardness | DIN 53305 (Shore A) | 80 |
| $\sigma B$ | DIN 53504 (MPa) | 34 |
| $\epsilon B$ | DIN 53504 (%) | 620 |
| $\sigma 100\%$ | DIN 53504 (MPa) | 7.0 |
| $\sigma 300\%$ | DIN 53504 (MPa) | 12.0 |

Both the above formulations are NCO-prepolymers based on adipic acid esters, BBG- and $C_4$-polyethers (molecular weight from 1000 to 5000) and aromatic isocyanates—in the first case reacted with aromatic or aliphatic difunctional or higher amines.

We claim:

1. A vehicle rim and vehicle tire consisting of a base, side walls and a tread merging with one another, characterized in that the tire has a continuous encircling empty space of substantially constant cross-section throughout located between the base and tread, the cross-section of the tread increases in thickness towards its zenith so that the moment of inertia of the tread is at least six times greater than that of the side walls, and the base of the tire inwardly of the encircling empty space contains an annular reinforcement of plastic material hardened after the tire is fitted on the rim to prevent the tire from being removed from the rim.

2. A tire as claimed in claim 1 characterized in that the encircling empty space between the tread and the base of the tire is substantially elliptical in cross-section.

3. A tire as claimed in claim 1, characterized in that the encircling empty space between the tread and the base of the tire is substantially bell-shaped in cross-section.

4. A tire as claimed in claim 1, characterized in that the encircling empty space between the tread and the base of the tire is substantially wedge-shaped in cross-section.

5. A tire as claimed in claim 1, characterized in that the annular reinforcement of hardened plastic material in the base of the tire is concentric to the rim.

6. A tire as claimed in claim 5, characterized in that the annular reinforcement of hardened plastic material consists of polyurethane.

7. A tire as claim in claim 1, characterized in that the tire is fabricated from natural or synthetic rubber.

8. A process for producing a tire comprising the steps of extruding a preform of natural or synthetic rubber having a cross-section corresponding to the cross-section of the tire, the preform having a continuous annular recess in the base thereof, fitting the preform to a tire rim so that the continuous recess encircles the rim and is located in the base of the tire within the space of the rim, vulcanizing the preform on the rim, introducing a hardenable plastic mixture into the annular recess encircling the rim to fill the recess with such plastic mixture, and hardening the mixture to thereby fasten the tire to the rim.

* * * * *